US012043043B2

(12) United States Patent
Miyazawa et al.

(10) Patent No.: US 12,043,043 B2
(45) Date of Patent: Jul. 23, 2024

(54) RECORDING SYSTEM

(71) Applicant: SEIKO EPSON CORPORATION, Tokyo (JP)

(72) Inventors: Masaki Miyazawa, Matsumoto (JP); Chiaki Endo, Matsumoto (JP); Hirohisa Adachi, Matsukawa-machi (JP)

(73) Assignee: Seiko Epson Corporation, Tokyo (JP)

( * ) Notice: Subject to any disclaimer, the term of this patent is extended or adjusted under 35 U.S.C. 154(b) by 183 days.

(21) Appl. No.: 17/814,919

(22) Filed: Jul. 26, 2022

(65) Prior Publication Data

US 2023/0022668 A1 Jan. 26, 2023

(30) Foreign Application Priority Data

Jul. 26, 2021 (JP) ................................ 2021-121311

(51) Int. Cl.
*B41J 29/02* (2006.01)

(52) U.S. Cl.
CPC .................................... *B41J 29/02* (2013.01)

(58) Field of Classification Search
CPC ........................................................ B41J 29/02
See application file for complete search history.

(56) References Cited

FOREIGN PATENT DOCUMENTS

| | | | | |
|---|---|---|---|---|
| JP | 2004264801 A * | 9/2004 | ............... | B65H 1/26 |
| JP | 2019-115988 A | 7/2019 | | |

* cited by examiner

*Primary Examiner* — Sharon Polk
(74) *Attorney, Agent, or Firm* — WORKMAN NYDEGGER

(57) ABSTRACT

A recording system includes a printer, a post-processing apparatus, and a first support to be mounted on a floor outside a mounting area of the printer. The printer includes a manual feed tray and an opening/closing portion each configured to be moved outward from a body of the printer to enable a process. The post-processing apparatus is located, in a Z direction, above the manual feed tray and the opening/closing portion that were moved. The first support supports the post-processing apparatus and forms a space in which the manual feed tray and the opening/closing portion are moved.

8 Claims, 11 Drawing Sheets

RECORDING SYSTEM

The present application is based on, and claims priority from JP Application Serial Number 2021-121311, filed Jul. 26, 2021, the disclosure of which is hereby incorporated by reference herein in its entirety.

BACKGROUND

1. Technical Field

The present disclosure relates to a recording system.

2. Related Art

The image forming system described in JP-A-2019-115988 includes a relay transportation unit in an internal output area of an image forming apparatus. The relay transportation unit transports sheets from an image forming unit to a post-processing unit. The relay transportation unit has a support. The post-processing unit is disposed on the support of the relay transportation unit.

The configuration described in JP-A-2019-115988, which supports a post-processing apparatus, may need to support a larger post-processing apparatus. In such a case, it is difficult for the relay transportation portion to support the larger post-processing apparatus. A lower portion of the post-processing apparatus may be elongated downward such that the post-processing apparatus is supported. In such a case, the post-processing apparatus covers a processing portion of the image forming apparatus, making it difficult to operate the processing portion.

SUMMARY

To solve the above-described problems, a recording system according to an aspect of the present disclosure includes a recording apparatus configured to record on a medium, a post-processing apparatus configured to perform a post-processing on the medium sent from the recording apparatus, and a first support to be mounted on a floor outside a mounting area of the recording apparatus. The recording apparatus includes a processing portion configured to be moved outward from a body of the recording apparatus to enable a process. The post-processing apparatus is located, in an apparatus height direction, above the processing portion that was moved. The first support supports the post-processing apparatus and forms a space in which the processing portion is moved.

DESCRIPTION OF EXEMPLARY EMBODIMENTS

Figure 1:
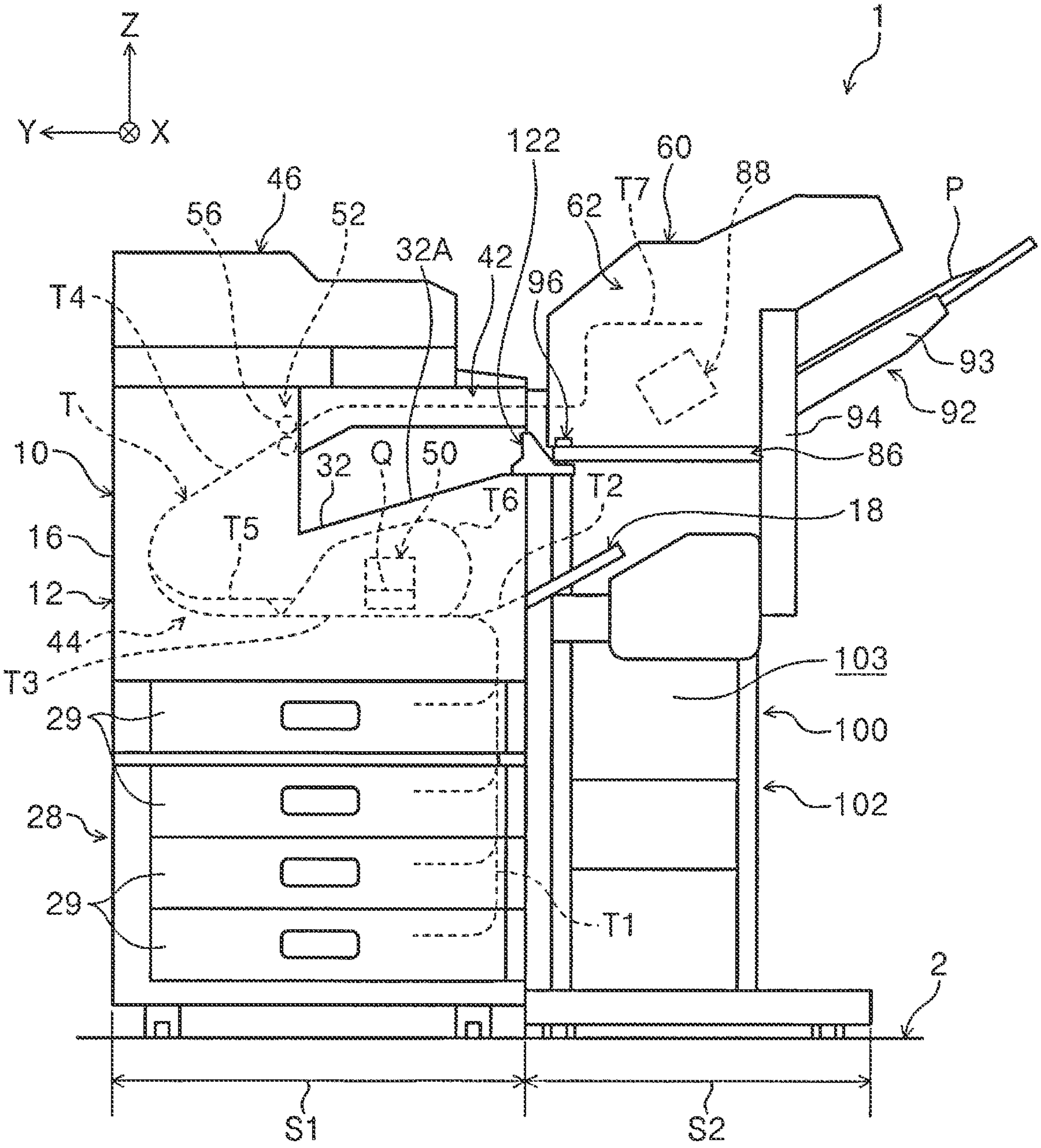
FIG. 1 is a front view illustrating an overall configuration of a recording system according to an embodiment.

Hereinafter, an outline of the present disclosure will be described. A recording system according to an aspect of the present disclosure includes a recording apparatus configured to record on a medium, a post-processing apparatus configured to perform a post-processing on the medium sent from the recording apparatus, and a first support to be mounted on a floor outside a mounting area of the recording apparatus. The recording apparatus includes a processing portion configured to be moved outward from a body of the recording apparatus to enable a process. The post-processing apparatus is located, in an apparatus height direction, above the processing portion that was moved. The first support supports the post-processing apparatus and forms a space in which the processing portion is moved.

In this configuration, the post-processing apparatus is supported by the first support mounted on the floor, enabling the post-processing apparatus to be reliably supported even when the post-processing apparatus increases in size. Furthermore, the space formed by the first support allows easier operation of the processing portion.

In the recording system, the first support may include a leg extending in the apparatus height direction and located rearward from the processing portion in an apparatus depth direction, and the leg may overlap, when viewed in the apparatus depth direction, at least a portion of the processing portion that was moved.

In this configuration, the processing portion is located forward from the leg in the apparatus depth direction. This reduces the possibility that, when the processing portion is operated, the first support will become an obstacle to the operation. Furthermore, the leg overlaps at least a portion of the processing portion when viewed in the apparatus depth direction. This makes the recording system smaller in a direction intersecting both the apparatus height direction and the apparatus depth direction.

In the recording system, the recording apparatus may include a second support supporting the post-processing apparatus. The leg may be located rearward from a center of gravity of the post-processing apparatus in the apparatus depth direction. The second support may be located forward from the center of gravity of the post-processing apparatus in the apparatus depth direction.

In this configuration, a portion of the post-processing apparatus that is located rearward from the center of gravity in the apparatus depth direction is supported by the leg. A portion of the post-processing apparatus that is located forward from the center of gravity in the apparatus depth direction is supported by the second support. This reduces the possibility that the post-processing apparatus will be tilted forward from the center of gravity in the apparatus depth direction.

In the recording system, the second support may be located above the processing portion in the apparatus height direction.

In this configuration, the second support is located above the processing portion in the recording apparatus, i.e., the second support is not located at the same height as the processing portion. This reduces the possibility that, when the processing portion is operated, the second support will become an obstacle to the operation.

In the recording system, the post-processing apparatus may include an adjuster configured to adjust a position of the post-processing apparatus in the apparatus height direction, and the second support may support the adjuster.

If there is a gap between the post-processing apparatus and the second support before the post-processing apparatus is supported by the second support, the post-processing apparatus will be supported by the second support while being tilted toward the second support. Here, in this embodiment, the adjuster fills the gap between the post-processing apparatus and the second support, reducing the possibility that the post-processing apparatus will be tilted. In other words, this configuration enables the post-processing apparatus to maintain the posture, resulting in a reduction of transportation error of the medium from the recording apparatus to the post-processing apparatus. In addition, this configuration allows the height of the post-processing apparatus to be adjusted at the front side in the apparatus depth direction, enabling easy adjustment of the height of the post-processing apparatus.

In the recording system, the first support may include a mounting portion to be mounted on the floor, and the mounting portion may have the leg thereon and extend forward from the leg in the apparatus depth direction.

In this configuration, the mounting portion having the leg thereon extends forward in the apparatus depth direction. The mounting portion limits rotation of the leg in a direction in which the leg is tilted forward. This reduces the possibility that the first support will be tilted forward.

In the recording system, the processing portion may include a cover configured to open and close a side portion of the recording apparatus and an operation lever configured to keep the cover closed at the side portion and terminate a state of keeping the cover closed when operated, and the operation lever may be located forward from a center of the processing portion in the apparatus depth direction.

In this configuration, the processing portion is located forward from the leg in the apparatus depth direction and the operation lever is located at the front side of the processing portion. This configuration allows the operation lever to be more readily operated than an operation lever located at the rear side.

In the recording system, the cover may be configured to be rotated about a rotation shaft of the recording apparatus to open and close the side portion, and the cover in a fully open position may have an end, farthest from the rotation shaft, which is in a mounting area of the post-processing apparatus when viewed in the apparatus height direction.

In this configuration, when the cover is in a fully open position, the front end of the cover does not protrude outward from a space below the post-processing apparatus. When the recording system is mounted, this configuration eliminates the need of securing a space for opening and closing the cover, and thus an extra mounting space is not required.

Hereinafter, a recording system 1 as an example of the embodiment of the present disclosure will be described in detail. As illustrated in FIG. 1, the recording system 1 includes, for example, a printer 10, a scanner unit 46, a post-processing apparatus 60, and a support 100 supporting the post-processing apparatus 60. The recording system 1 is an ink jet recording system that ejects an ink Q, which is an example of liquid, onto a sheet P, which is an example of a medium, to record.

The X direction is an example of an apparatus depth direction of the recording system 1. The X direction includes a −X direction pointed by the tail of the arrow and a +X direction pointed by the head of the arrow. The X direction is also an example of the width direction of the sheet P. The Y direction is an example of the apparatus width direction of the recording system 1. The Y direction includes a +Y direction pointed by the head of the arrow and a −Y direction pointed by the tail of the arrow. The Z direction is an example of the apparatus height direction of the recording system 1 and corresponds to a direction perpendicular to both the X direction and the Y direction. The Z direction includes a +Z direction pointed by the head of the arrow and a −Z direction pointed by the tail of the arrow. In the following description, the +Z direction may be referred to as "above" and the −Z direction may be referred to as "below." When the positive and negative of the directions do not need to be specified, the directions are simply referred to as the X, Y, and Z directions.

The printer 10 is an example of a recording apparatus that records on a sheet P. The printer 10 is in a mounting area S1 of a floor 2. The printer 10 includes, for example, an apparatus body 12, a sheet storage 28 that stores a sheet P, a sheet transportation portion 44 that transports the sheet P, a recording portion 50 that records on the sheet P, an output portion 52 that outputs the sheet P, a receiving portion 32 that receives the outputted sheet P, a relay unit 42 that transports the sheet P above the receiving portion 32, and a controller (not illustrated).

Figure 2:
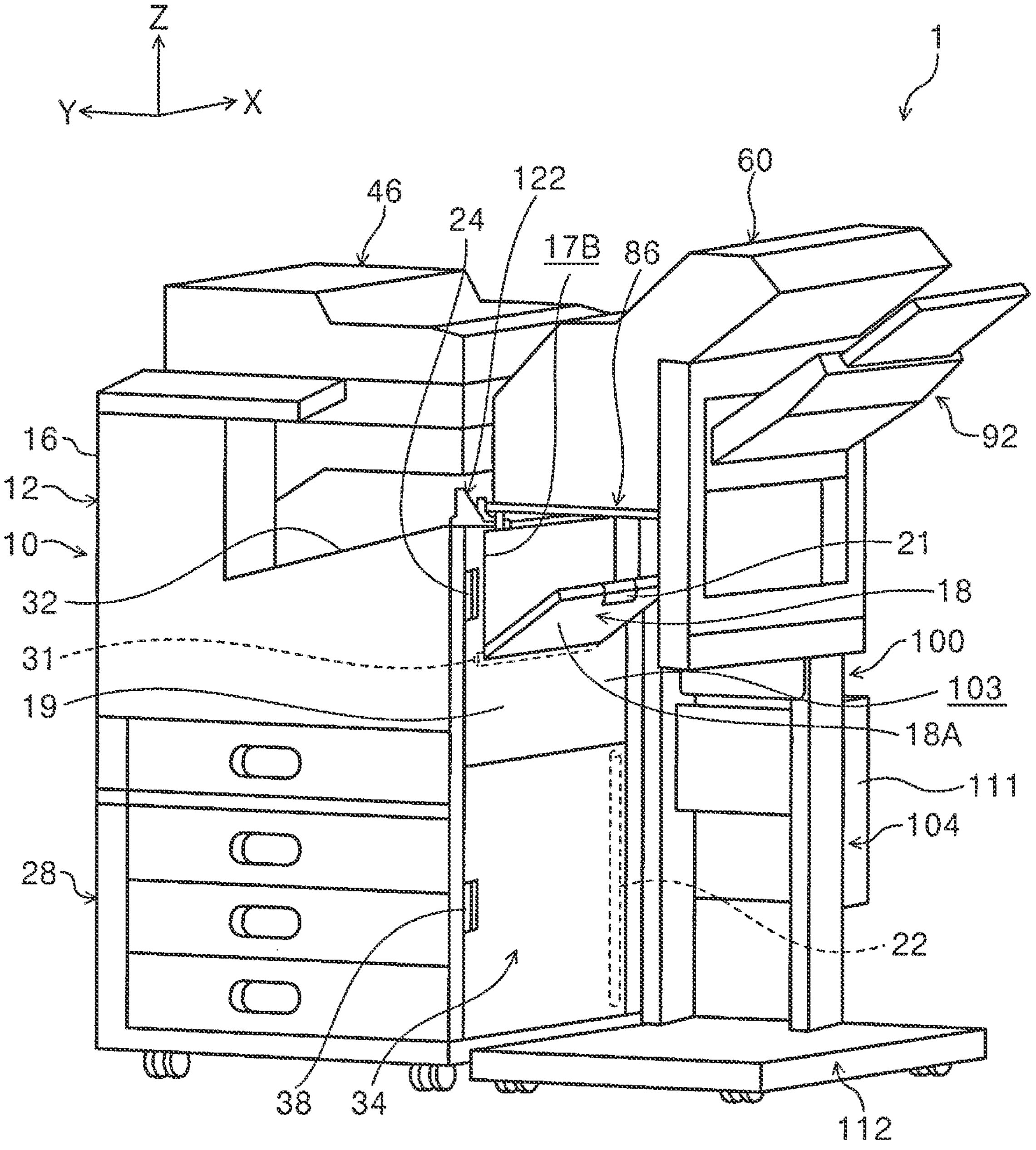
FIG. 2 is a perspective view illustrating an overall configuration of the recording system according to the embodiment.

The apparatus body 12 includes a body frame (not illustrated), attachment frames 13 and 14 (FIG. 6) attached to the body frame, a housing 16 that forms an outer shape of the apparatus body 12, and a manual feed tray 18. The sheet storage 28 is located below the middle of the apparatus body 12 in the Z direction. The sheet storage 28 includes, for example, four sheet cassettes 29 and an opening/closing portion 34 (FIG. 2). The sheet transportation portion 44 includes, for example, a pick-up roller, a sheet feed roller, a separation roller, multiple transportation rollers, a belt unit, and a motor (all not illustrated). The sheet transportation portion 44 constitutes a transportation path T along which the sheet P is transported.

The transportation path T includes, for example, a vertical transportation path T1, a manual feed path T2, a straight path T3, an output path T4, a switchback path T5, and an inversion path T6. The vertical transportation path T1 extends in the +Z direction at the end in the −Y direction of the sheet storage 28. The vertical transportation path T1 is a path along which the sheets P sent from the sheet cassettes 29 are transported.

The manual feed path T2 is a path extending from the manual feed tray 18 in the +Y direction. The manual feed path T2 joins the vertical transportation path T1 and is coupled to the straight path T3. The straight path T3 is a path extending in a straight line in the Y direction. The straight path T3 faces the recording portion 50 (described later) in the Z direction. The output path T4 extends in a C-shape from the straight path T3 to the output portion 52 (described later). The switchback path T5 temporary receives the sheet P on which a record was made by the recording portion 50. The sheet P on the switchback path T5 is sent to the inversion path T6. The inversion portion T6 has a portion located above the recording portion 50 in the +Z direction and below the receiving portion 32 in the −Z direction. The inversion portion T6 is partly exposed to the outside when a portion of the receiving portion 32 is turned.

Figure 3:
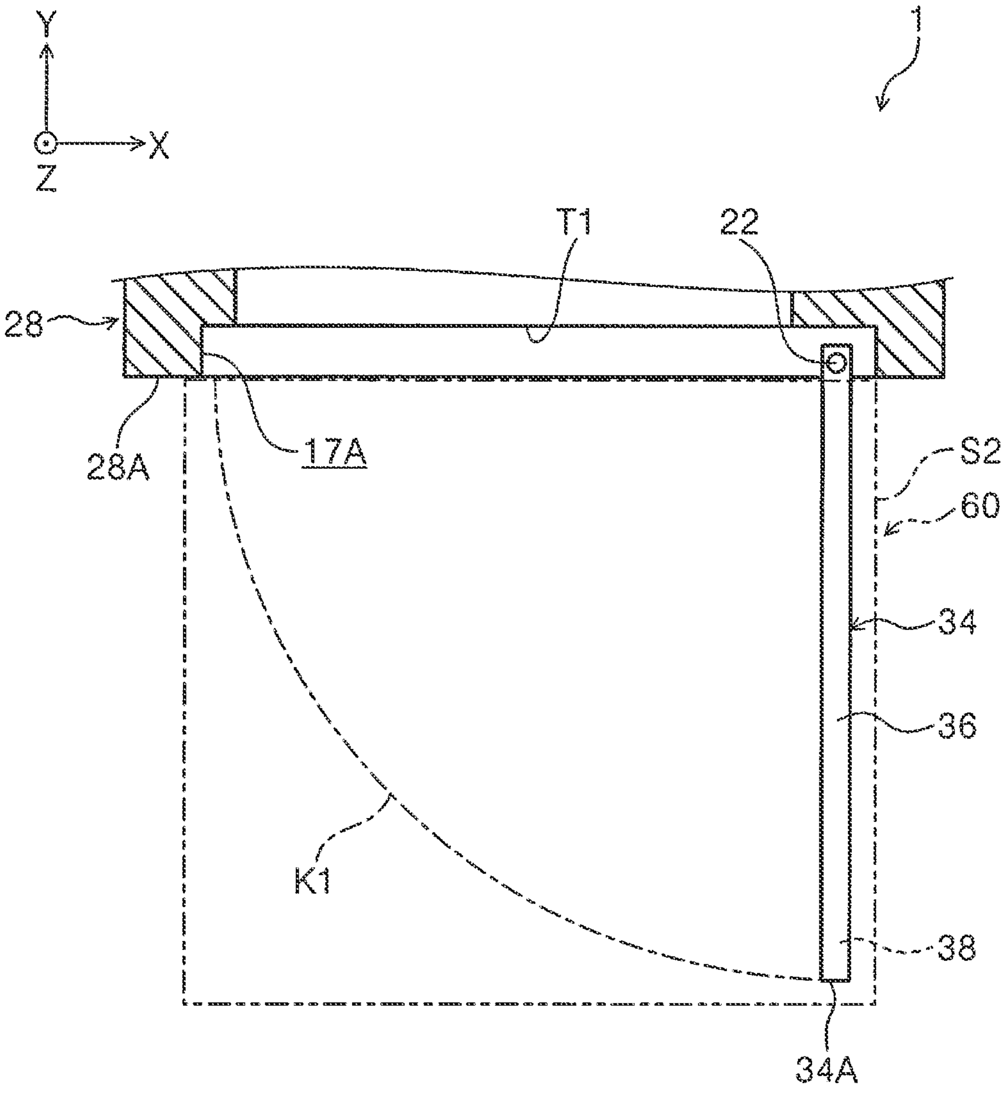
FIG. 3 is a schematic view illustrating a positional relationship between an opening/closing portion in an open position and a mounting area of a post-processing apparatus of the recording system according to the embodiment.

As illustrated in FIG. 3, a side portion 28A of the sheet storage 28 located at the end in the −Y direction has a first opening 17A facing the vertical transportation path T1 in the Y direction. The first opening 17A has a rectangular shape when viewed in the Y direction. A rotation shaft 22 is rotatably disposed at the end in the +X direction of the first opening 17A. The rotation shaft 22 extends in the Z direction. The rotation shaft 22 is attached to the opening/closing portion 34. In other words, the opening/closing portion 34 is rotatable about the rotation shaft 22.

The opening/closing portion 34 is an example of a processing portion configured to be moved outward from the body of the sheet storage 28 to enable a process. The body of the sheet storage 28 is included in the apparatus body 12. An example of the process at the opening/closing portion 34 is a process of removing the sheet P left in the vertical transportation path T1. The opening/closing portion 34 includes, for example, a cover 36 and an operation lever 38.

The cover 36 is configured to open and close the side portion 28A of the printer 10. Specifically described, the cover 36 can switch between a closed state in which the first opening 17A is closed and an open state in which the first opening 17A is open. In this way, the opening/closing portion 34 is rotated about the rotation shaft 22 to open and close the first opening 17A.

The operation lever 38 keeps the cover 36 closed at the side portion 28A and terminates a state of keeping the cover 36 closed when operated. Specifically described, the operation lever 38 is positioned at the end in the −X direction of the closed opening/closing portion 34. In other words, the operation lever 38 is located forward from the center of the opening/closing portion 34 in the X direction, or in the −X direction. The operation lever 38 is configured to lock the opening/closing portion 34 to the body frame (not illustrated). The operation lever 38 is configured to terminate the locked state of the opening/closing portion 34 when operated. When the opening/closing portion 34 is open, the vertical transportation path T1 is exposed through the first opening 17A. This enables removal of the sheet P left in the vertical transportation path T1.

The end of the opening/closing portion 34 that is farthest from the rotation shaft 22 is a front edge 34A. When viewed in the Z direction, the area where the post-processing apparatus 60 is mounted is referred to as a mounting area S2. Here, the opening/closing portion 34 in a fully open position has the front edge 34A in the mounting area S2 when viewed in the Z direction. The trajectory of the movement of the front edge 34A is a curve K1 curved in an arc-like shape. The curve K1 is in the mounting area S2, for example.

As illustrated in FIG. 2, the housing 16 has a rectangular second opening 17B at the end in the −Y direction. The manual feed path T2 (FIG. 1) is coupled to the straight path T3 (FIG. 1) through the second opening 17B. A shaft 31 is disposed at the end in the −Z direction of the second opening 17B. The shaft 31 extends in the X direction.

The manual feed tray 18 is an example of the processing portion configured to be moved outward from the apparatus body 12 to enable a process. The process at the manual feed tray 18 is a process of feeding sheets P along the manual feed path T2. The manual feed tray 18 is rotatable about the shaft 31. In other words, the manual feed tray 18 can switch between a closed state in which the second opening 17B is closed and an open state in which the second opening 17B is open. The manual feed tray 18 in the open state can receive the sheet P.

The manual feed tray 18 has an operation member 21 at the end in the +Z direction and the middle in the X direction. The operation member 21 keeps the manual feed tray 18 closed when engaged with the edge of the second opening 17B. The manual feed tray 18 includes a tray body 18A rotatable about the shaft 31 and an extension tray 18B (FIG. 10) that can be pulled obliquely upward from the tray body 18A.

A peripheral wall 19 around the manual feed tray 18 of the housing 16 is configured to be opened and closed about a shaft (not illustrated) extending in the Z direction, for example. The peripheral wall 19 is opened and closed by using a lever 24. The lever 24 is located at the end of the peripheral wall 19 away from the manual feed tray 18 in the −X direction.

As illustrated in FIG. 1, the recording portion 50 is a line head, for example. The recording portion 50 has multiple nozzles (not illustrated) arranged over the entire area in the X direction of the sheet P. The recording portion 50 ejects an ink Q fed from an ink tank (not illustrated) toward the sheet P through the nozzles to record on the sheet P. The output portion 52 is in the apparatus body 12. The output portion 52 outputs the sheet P on which a record was made by the recording portion 50 to the relay unit 42 (described later) or to the receiving portion 32. The output portion 52 includes, for example, an output roller pair 56.

Figure 4:
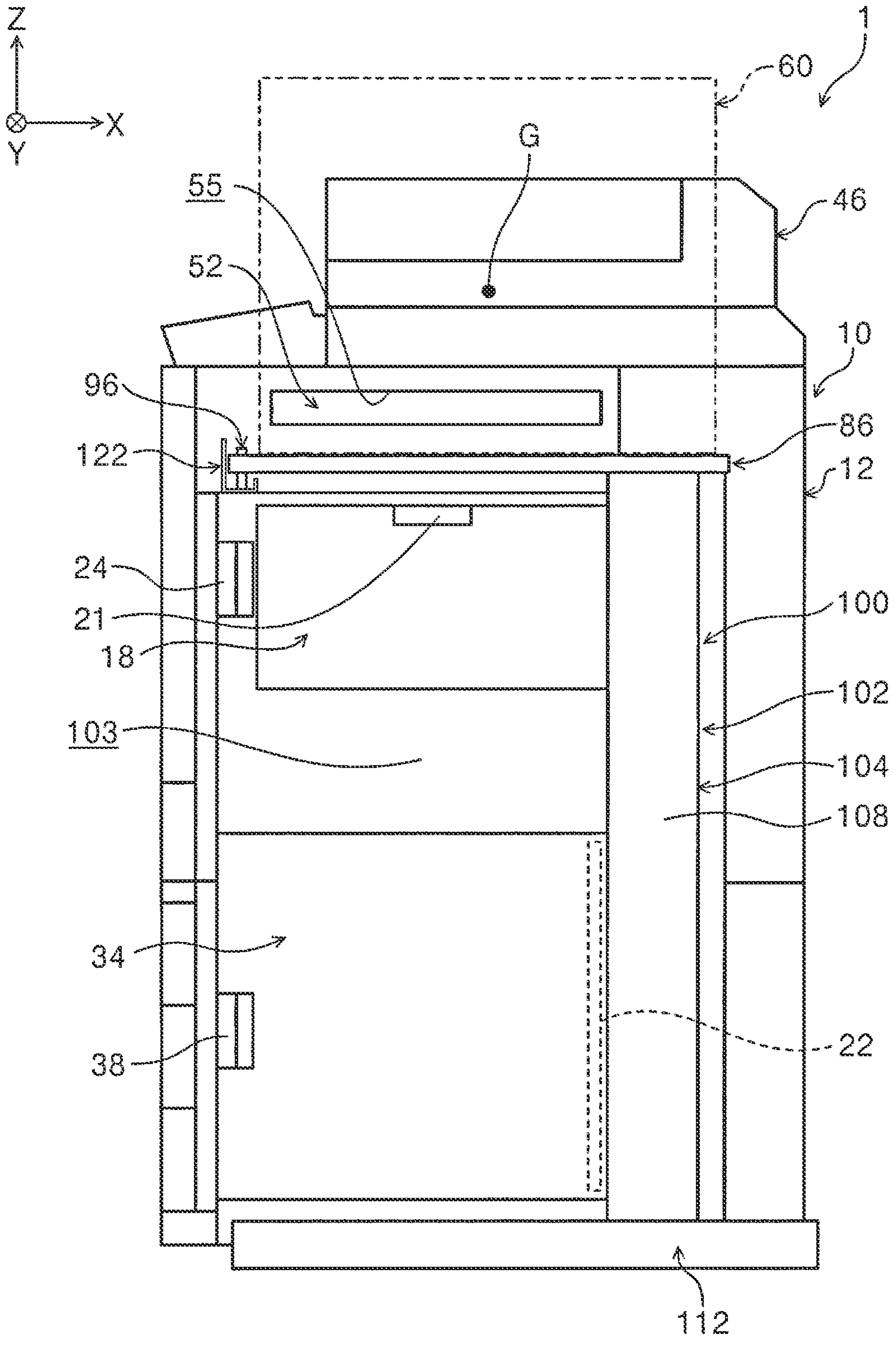
FIG. 4 is a side view illustrating the recording system according to the embodiment.

As illustrated in FIG. 4, the side of the apparatus body 12 at the end in the −Y direction has an outlet 55 at a position corresponding to the output portion 52. The outlet 55 is an opening through which the sheet P is sent toward the post-processing apparatus 60 (described later). In FIG. 4, the outline of the post-processing apparatus 60 is indicated by an imaginary line. The center of gravity G of the post-processing apparatus 60 is indicated by a dot G.

As illustrated in FIG. 1, the receiving portion 32 is in the apparatus body 12 for the internal output, for example. The receiving portion 32 has a receiving surface 32A. The receiving surface 32A extends obliquely upward in a direction intersecting the Y direction toward the post-processing apparatus 60. The relay unit 42 is located above the receiving portion 32. The relay unit 42 receives the sheet P outputted from the output portion 52 and transports the sheet P toward the post-processing apparatus 60 (described later).

The controller (not illustrated) of the printer 10 includes a central processing unit (CPU), read-only memory (ROM), random-access memory (RAM), and a storage (all not illustrated). The controller controls transportation of the sheet P in the printer 10, output of the sheet P through the output portion 52, and operations of the components including the recording portion 50 and the relay unit 42. The scanner unit 46 is disposed on the top of the printer 10. The scanner unit 46 reads information on a document (not illustrated).

The post-processing apparatus 60 is located above the opening/closing portion 34 (FIG. 2) in an open position. The post-processing apparatus 60 performs the post-processing on the sheet P sent from the output portion 52 of the printer 10, for example. In other words, the post-processing apparatus 60 is located downstream of the output portion 52 in the output direction of the sheet P. The post-processing apparatus 60 includes, for example, a body 62 including the housing, a bottom member 86 supporting the body 62, a stapler 88, a movable tray 92, and an adjuster 96. Furthermore, the post-processing apparatus 60 includes a post-processing path T7 along which the sheet P sent from the relay unit 42 is transported. The bottom member 86 is located above the receiving portion 32 in the Z direction and below the relay unit 42 in the Z direction, for example.

The stapler 88 performs a stapling process of stapling a predetermined number of sheets P together, which is one of examples of the post-processing. The bundle of sheets P stapled together by the stapler 88 is outputted onto the movable tray 92. Other examples of the post-processing performed on the sheet P include a punching process of making a punch hole in the sheet P, a folding process of folding the bundle of sheets P, a cutting process of cutting the sheet P, a process of folding a signature sheet P, and a binding process of binding the sheets P into a book.

The movable tray 92 is disposed on the side of the body 62 at the end in the −Y direction. The movable tray 92 includes a tray 93 and a driving portion 94 that moves the tray 93. The tray 93 is moved up or down in the Z direction by the driving portion 94 depending on the amount of the sheets P on the tray 93. The driving portion 94 extends in the −Z direction beyond the lower end of the post-processing apparatus 60.

Figure 5:
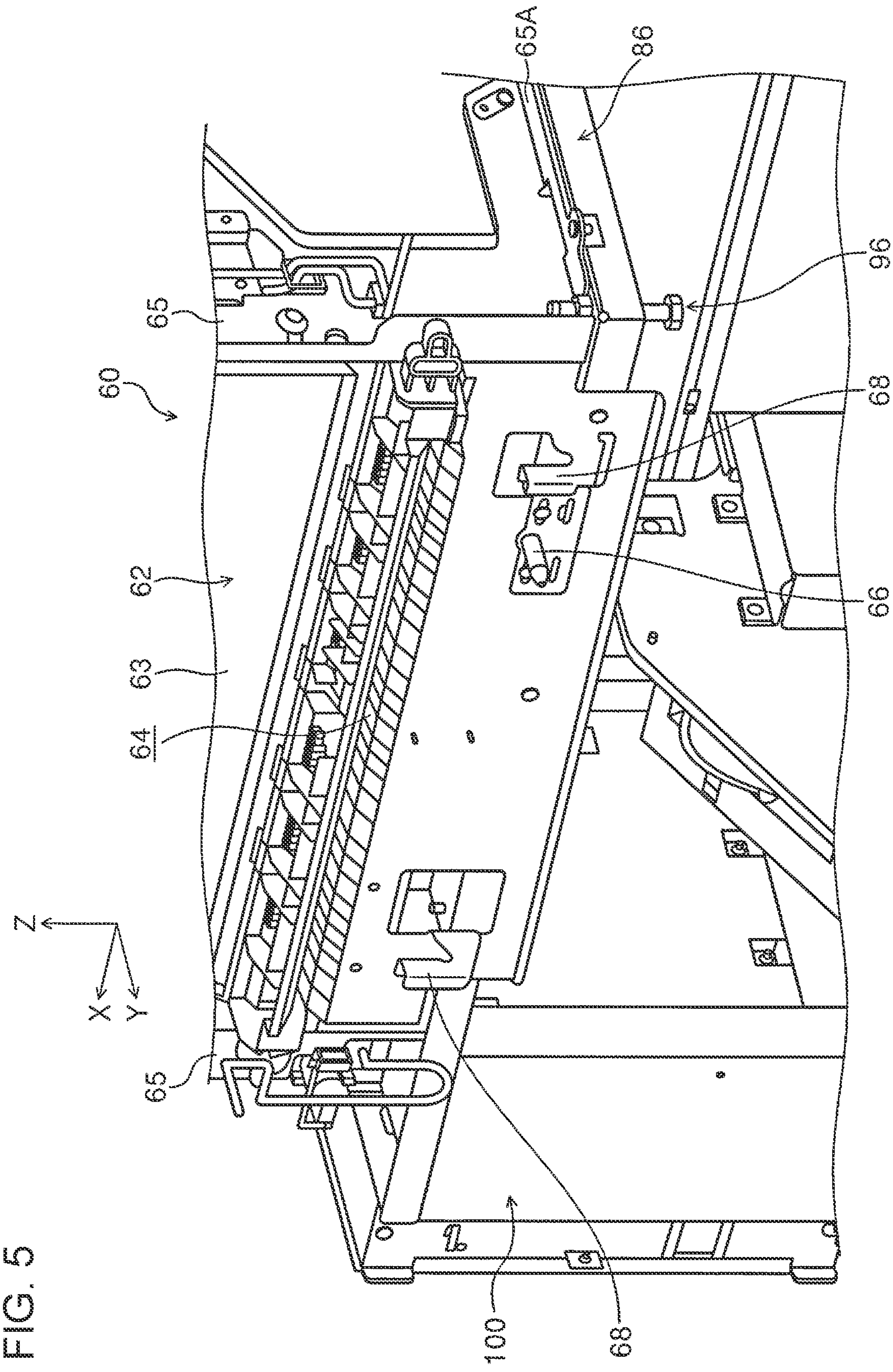
FIG. 5 is a perspective view illustrating a side of the post-processing apparatus of the recording system according to the embodiment.

As illustrated in FIG. 5, the body 62 has a front wall 63 located away from the center (not illustrated) of the body 62 in the +Y direction and side walls 65 located at ends away from the center in the X direction. The front wall 63 has an inlet 64. The inlet 64 receives the sheet P sent out from the relay unit 42 (FIG. 1). The front wall 63 has one pin 66 and two holders 68 at positions away from the inlet 64 in the −Z direction, for example. The side wall 65 has a flange 65A extending outwardly in the X direction. The flange 65A extends outwardly from the end in the −Z direction of the side wall 65. The flange 65A is attached to the bottom member 86.

Figure 7:
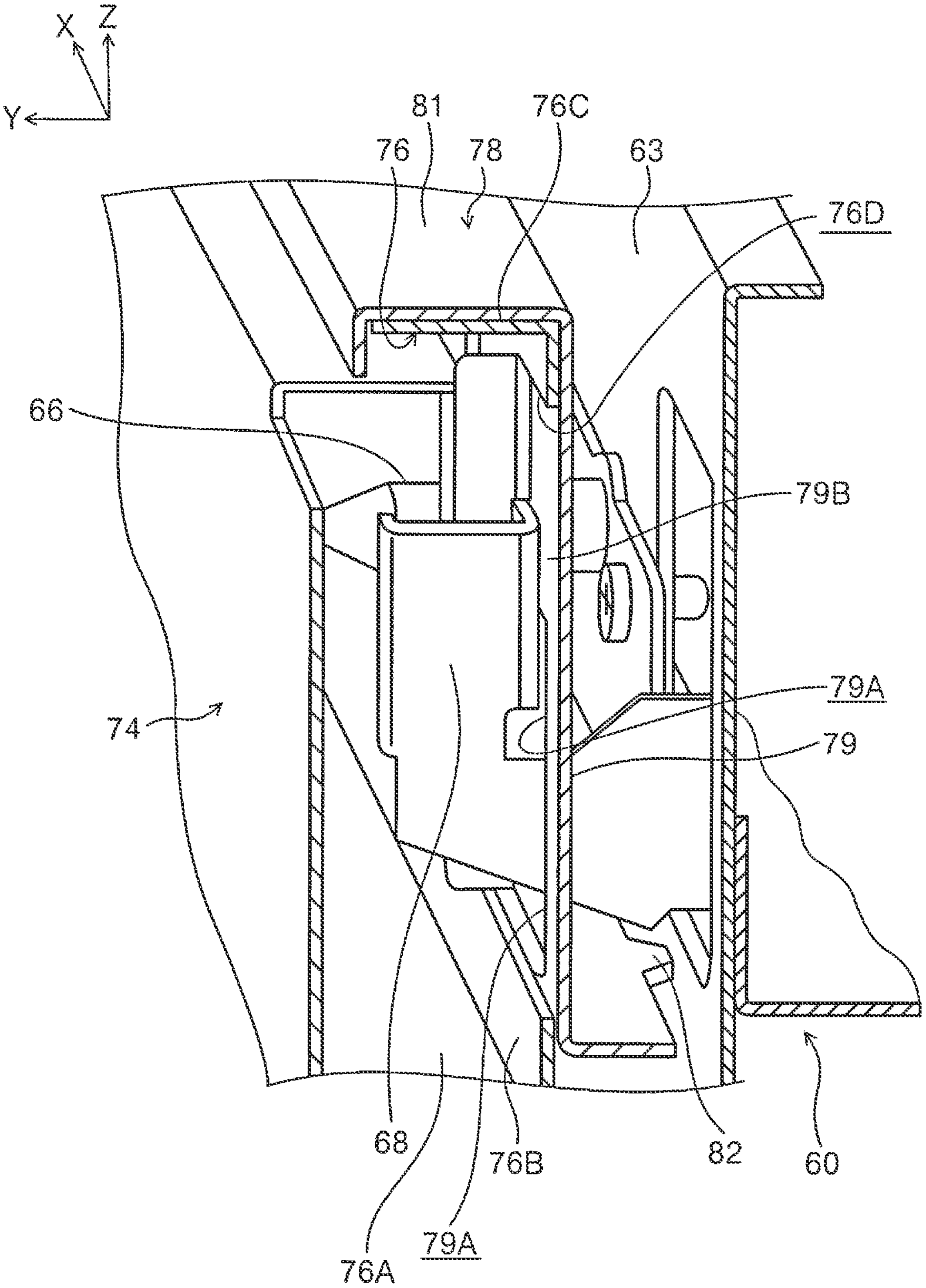
FIG. 7 is a perspective view illustrating a portion where the post-processing apparatus of the recording system according to the embodiment is coupled to the recording apparatus.

As illustrated in FIG. 7, the pin 66 limits the movement in the X direction when inserted into a vertical hole (not illustrated) in a guide frame 76 (described later). The holder 68 protrudes from the front wall 63 in the +Y direction. The holder 68 has an L-like outer shape when viewed in the X direction. The holder 68 can pass through a through hole (not illustrated) in a slider 78 (described later) in the Y direction but cannot pass through the through hole 79A in the slider 78 in the Y direction.

Figure 6:
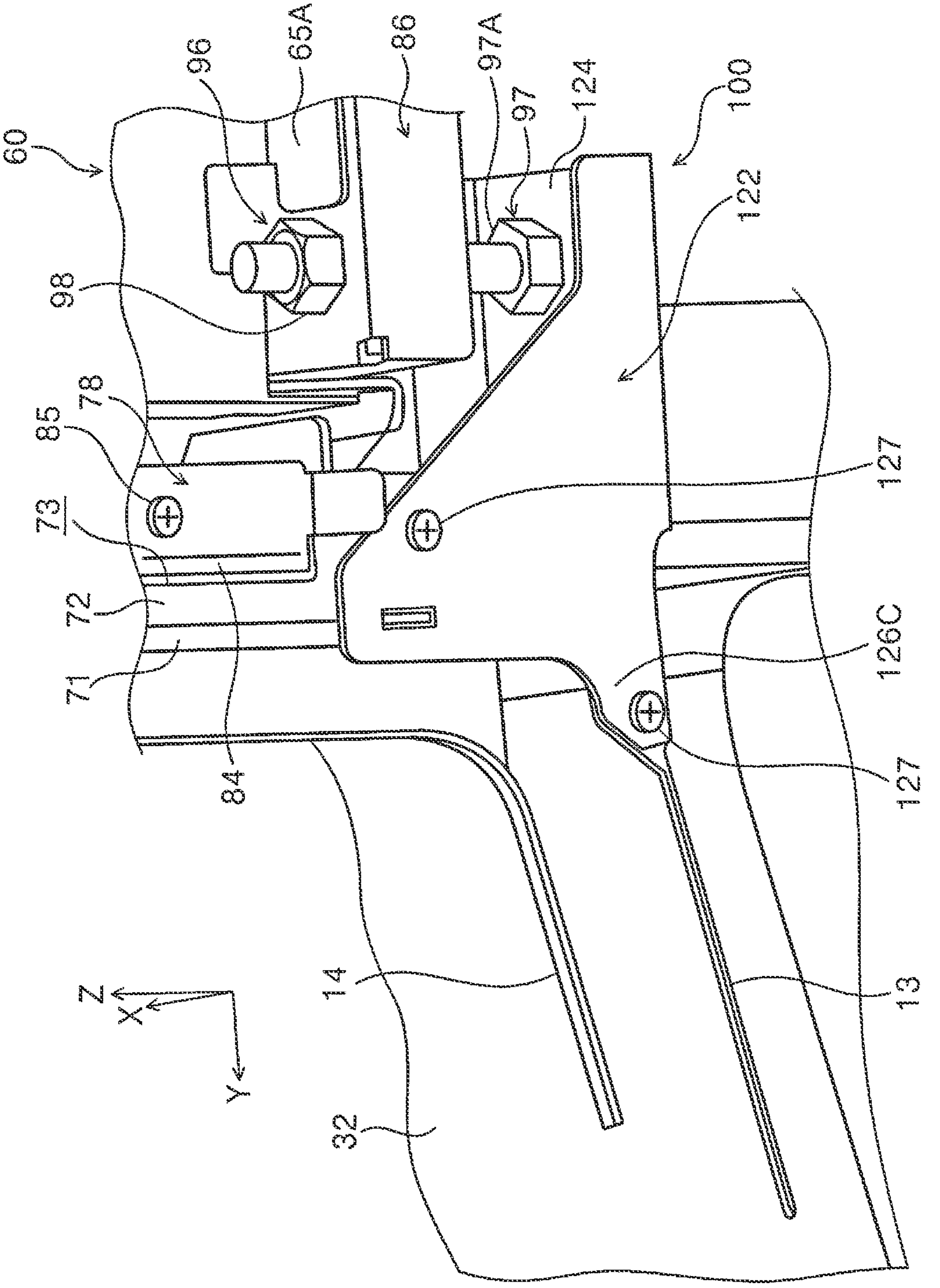
FIG. 6 is a perspective view illustrating a second support of the recording system according to the embodiment and a portion around the second support.

As illustrated in FIG. 6, the attachment frame 13 is located away in the −X direction and the −Y direction from the center (not illustrated) of the receiving portion 32. The attachment frame 13 protrudes from the receiving portion 32 in the +Z direction. The attachment frame 14 is located away in the +X direction from the attachment frame 13 on the receiving portion 32. The attachment frame 14 extends in the +Z direction from the receiving portion 32. A fixing frame 71 is attached to the attachment frame 14. The fixing frame 71 has a vertical wall 72 extending along the Y-Z plane. The vertical wall 72 has a vertical hole 73.

As illustrated in FIG. 7, the apparatus body 12 includes an attachment frame 74, a guide frame 76, and a slider 78. The attachment frame 74 is attached to the fixing frame 71 (FIG. 6) and extends in the X direction. The guide frame 76 includes a bottom wall 76A, a vertical wall 76B extending straight vertically in the +Z direction from the bottom wall 76A, and an upper wall 76C extending in the +Y direction from the end in the +Z direction of the vertical wall 76B. The vertical wall 76B has a through hole 76D. The through hole 76D is large enough to allow passage of the holder 68 in the Y direction. The guide frame 76 has a vertical hole (not illustrated) into which the pin 66 is inserted. The vertical hole is a long hole extending in the Z direction.

The slider 78 extends in the X direction. The slider 78 includes a vertical wall 79 extending in the X direction, a guided portion 81 at the end in the +Z direction of the vertical wall 79, a protrusion 82 at the end in the −Z direction of the vertical wall 79, and an insertion portion 84 (FIG. 6) insertable into the vertical hole 73 (FIG. 6). The vertical wall 79 has a through hole (not illustrated) large enough to allow passage of the holder 68 and a thorough hole 79A that is in communication with the through hole and located away from the through hole in the −X direction. A portion of the vertical wall 79 located away from the through hole 79A in the +Z direction is referred to as a wall portion 79B.

The guided portion 81 is guided in the X direction when brought in contact with both the vertical wall 76B and the upper wall 76C. This enables the slider 78 to be slid in the X direction. The protrusion 82 positions the post-processing apparatus 60 in the Y direction when brought in contact with the front wall 63.

As illustrated in FIG. 6, the insertion portion 84 is inserted into the vertical hole 73 in the +X direction when the slider 78 is slid in the +X direction. The insertion portion 84 inserted into the vertical hole 73 is fastened to the vertical wall 72 with a screw 85. The post-processing apparatus 60 is positioned in the X, Y, and Z directions when the screw 85 is fastened.

Figure 8:
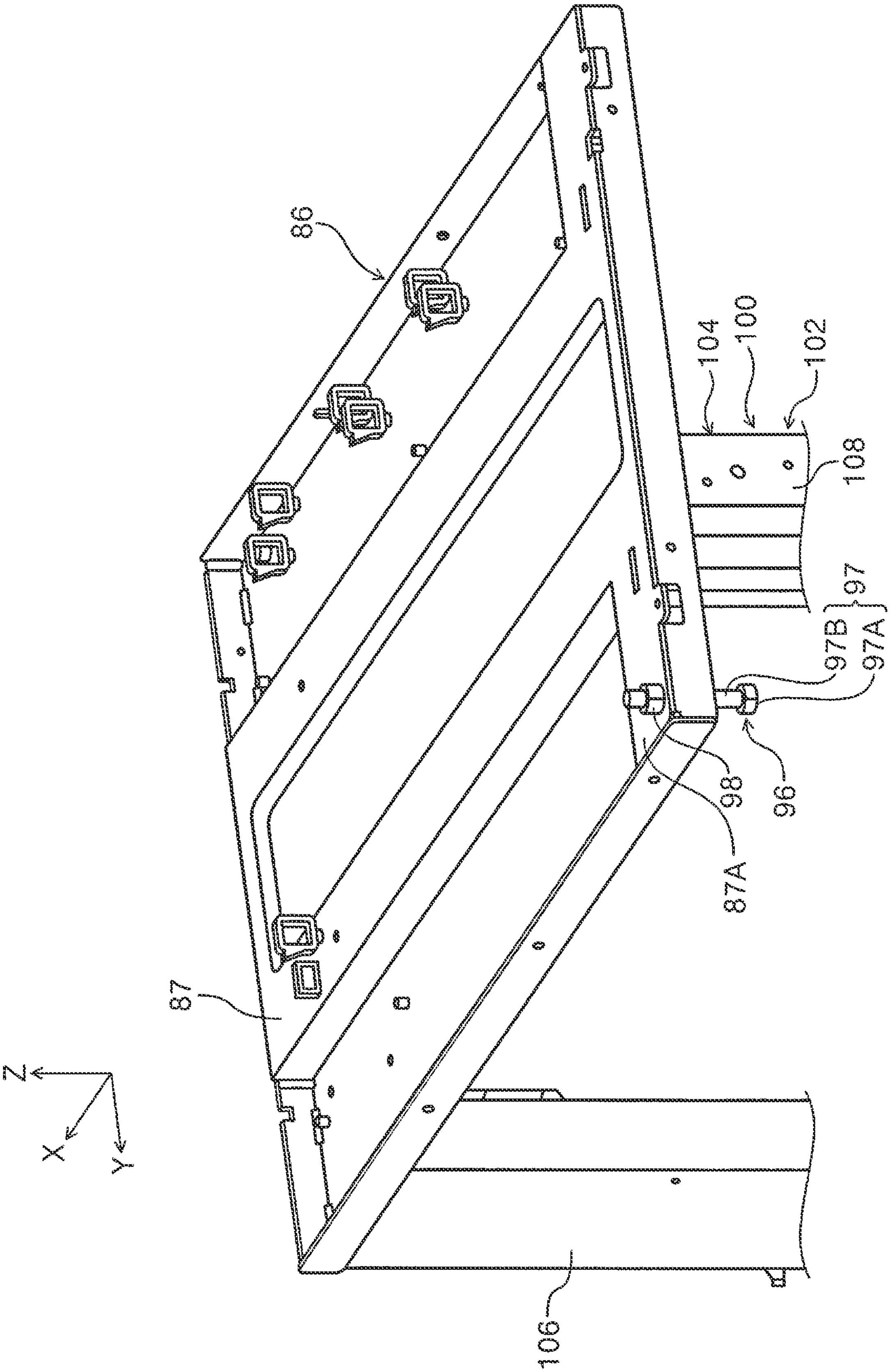
FIG. 8 is a perspective view illustrating a bottom member of the post-processing apparatus of the recording system according to the embodiment.

As illustrated in FIG. 8, the bottom member 86 has, for example, side surfaces extending in the X direction or the Y direction and has a plate-like shape having a predetermined thickness in the Z direction. The end portions in the Y direction of the bottom member 86 are recessed more in the −Z direction than the middle portion. The bottom member 86 has an upper wall 87 at the end in the +Z direction and the upper wall 87 has the adjuster 96 (described later) at a corner 87A located away in the −X direction and the +Y direction from the center. The corner 87A has a screw hole (not illustrated) extending through the upper wall 87 in the Z direction. The end in the +X direction of the bottom member 86 is supported by a leg 104 (described later) but a portion other than the end in the +X direction of the bottom member 86 is not supported. In other words, the bottom member 86 is supported by the leg 104 in a cantilevered manner.

The adjuster 96 is configured to adjust the position of the post-processing apparatus 60 in the Z direction. The adjuster 96 includes, for example, a bolt 97, a screw hole (not illustrated) in the upper wall 87, and a nut 98. The bolt 97 has a head 97A and a shaft 97B. The shaft 97B is fastened to a screw hole (not illustrated) in the upper wall 87. The nut 98 is used to fix the position of the bolt 97 after the height adjustment using the bolt 97. The position of the post-processing apparatus 60 (FIG. 1) in the +Z direction is adjusted by changing the amount of the shaft 97B protruding from the upper wall 87 in the +Z direction.

As illustrated in FIG. 1, the support 100 includes, for example, a first support 102 and a second support 122. The first support 102 is located on the floor 2 outside the mounting area S1 of the printer 10. The first support 102, which supports the post-processing apparatus 60, forms a space 103 in which the opening/closing portion 34 (FIG. 2)

is moved. The second support 122, which supports the post-processing apparatus 60, is included in the printer 10. The first and second supports 102 and 122 will be described in detail below.

Figure 9:
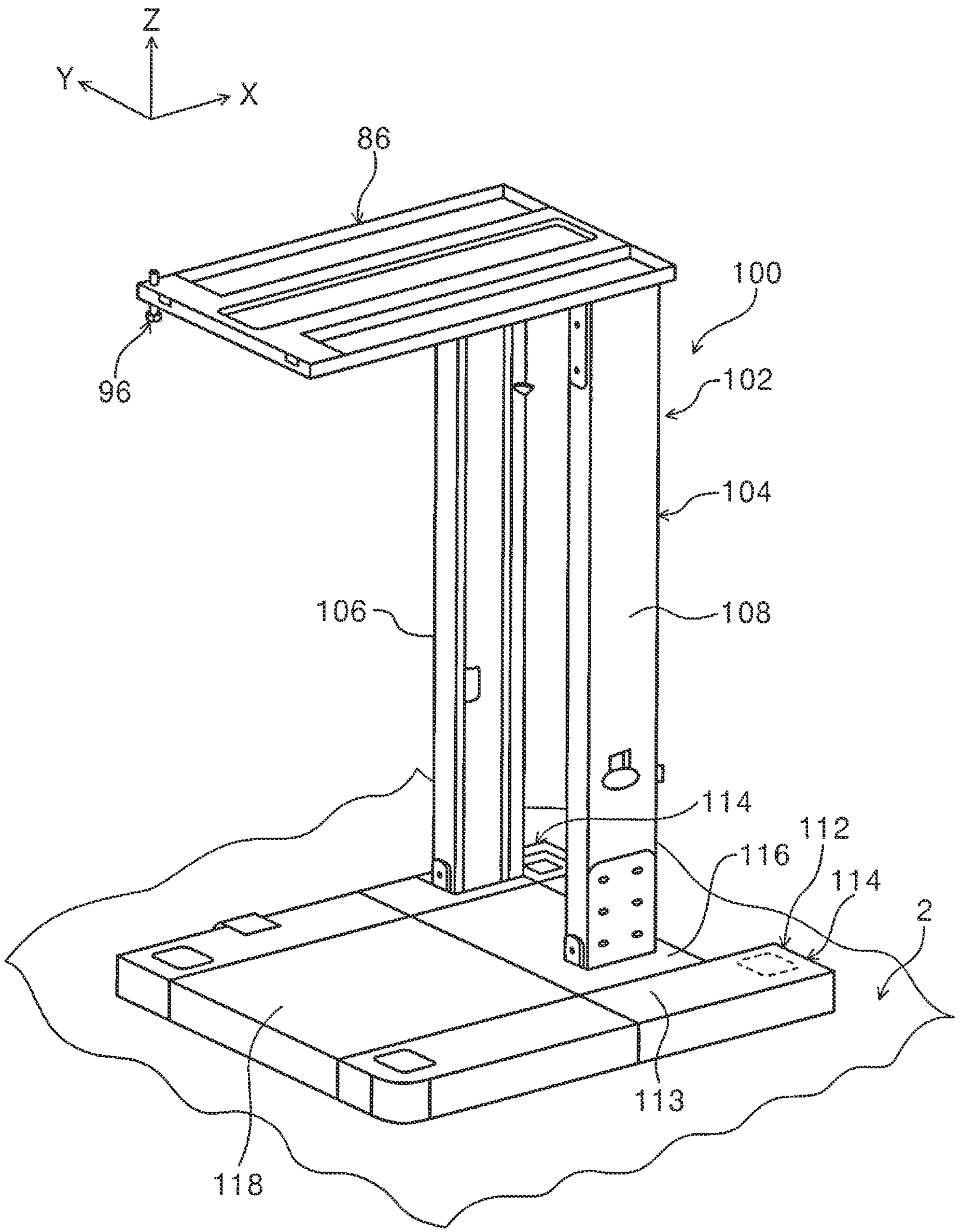
FIG. 9 is a perspective view illustrating a first support of the recording system according to the embodiment.

As illustrated in FIG. 9, the first support 102 includes, for example, the leg 104 extending in the Z direction and a mounting portion 112 to be mounted on the floor 2. The leg 104 is located rearward from the opening/closing portion 34 (FIG. 2) in the X direction, or in the +X direction. The leg 104 includes, for example, a first leg 106 and a second leg 108 spaced apart from each other in the Y direction. The second leg 108 is positioned away from the first leg 106 in the −Y direction. The first and second legs 106 and 108 each have a square cylindrical shape and have about the same shape and height.

The mounting portion 112 having the leg 104 thereon extends forward from the leg 104 in the X direction, or in the −X direction. The mounting portion 112 includes, for example, two first mounting portions 114 spaced apart from each other in the Y direction and extend in the X direction, a coupling portion 116 coupling the two first mounting portions 114 together in the Y direction, and a covering portion 118 covering a portion, of the two first mounting portions 114, in the −X direction and between from the coupling portion 116. The upper surface 113 of the mounting portion 112 facing in the +Z direction extends along the X-Y plane.

The end in the −Z direction of the first leg 106 is attached to one of the first mounting portions 114 that is disposed in the Y direction positive to the other, for example. The end in the −Z direction of the second leg 108 is attached to a portion of the coupling portion 116 that is away in the −Y direction from the center in the Y direction of the coupling portion 116, for example. The end in the +X direction of the bottom member 86 is attached to the ends in the +Z direction of the first and second legs 106 and 108. In this way, the bottom member 86 is supported by the leg 104.

As illustrated in FIG. 4, the leg 104 is located rearward from the center of gravity G of the post-processing apparatus 60 in the X direction, or in the +X direction. The space 103 is defined at a position away from the bottom member 86 in the −Z direction and away from the leg 104 in the −X direction. The manual feed tray 18 and the opening/closing portion 34 are each opened and closed in the space 103. A storage box 111 (FIG. 2) is attached to the middle in the Z direction of the leg 104, for example. The storage box 111 stores a main board, a sub board, and a power (all not illustrated).

Figure 10:
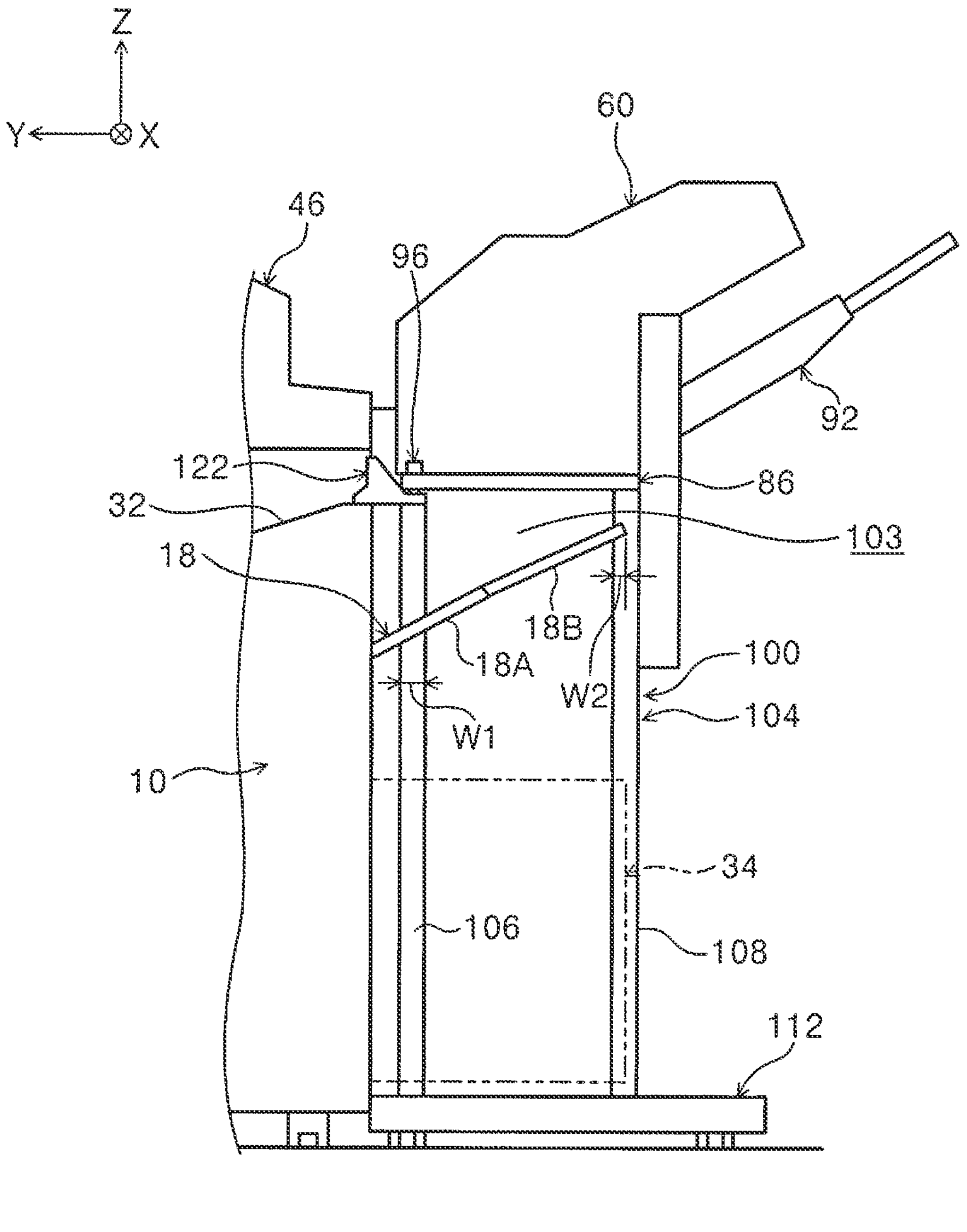
FIG. 10 is a schematic view illustrating a positional relationship between a portion of the recording apparatus and the first and second supports in the recording system according to the embodiment.

As illustrated in FIG. 10, the manual feed tray 18 is in an opened-up state when the extension tray 18B is pulled out obliquely upward from the tray body 18A. When the manual feed tray 18 is in the opened-up state, the leg 104 overlaps a portion of the manual feed tray 18 when viewed in the −X direction. In other words, the leg 104 has an overlap space W1 [mm] and an overlap space W2 [mm] each overlapping a portion of the manual feed tray 18 when viewed in the −X direction. Furthermore, with the opening/closing portion 34 being in a fully open position, the leg 104 overlaps a portion of the opening/closing portion 34 when viewed in the −X direction.

As illustrated in FIG. 4, the second support 122 is located forward from the center of gravity G of the post-processing apparatus 60 in the X direction. The second support 122 is located above the manual feed tray 18 and the opening/closing portion 34 in the Z direction. The second support 122 supports the adjuster 96.

Figure 11:
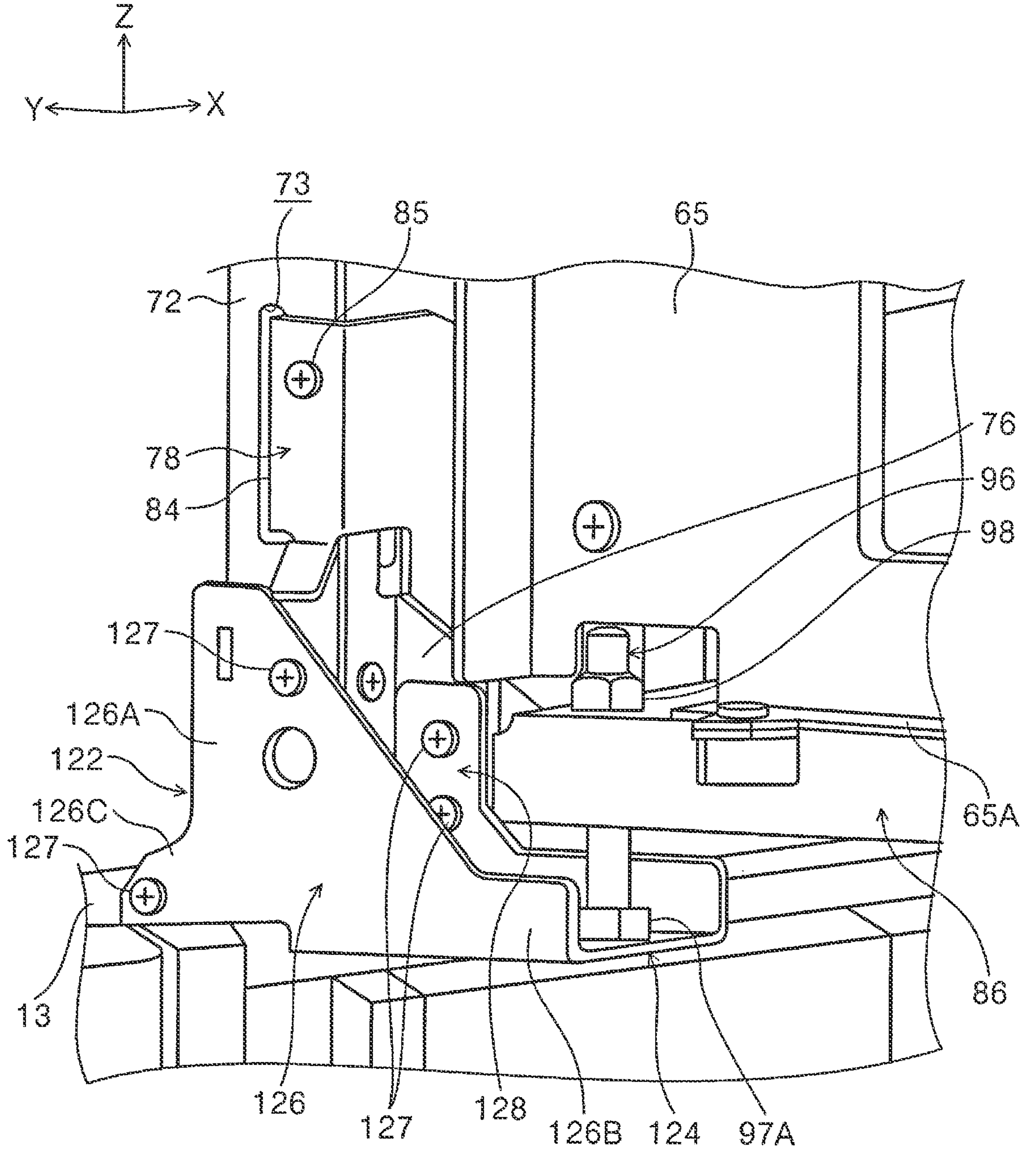
FIG. 11 is a perspective view illustrating the second support of the recording system according to the embodiment and a portion around the second support.

As illustrated in FIG. 11, the second support 122 includes, for example, a bottom wall 124, a first side wall 126, a second side wall 128, and a coupling wall (not illustrated). The bottom wall 124 has a rectangular shape in which the dimension in the Y direction is longer than the dimension in the X direction. The first side wall 126 extends straight vertically in the +Z direction from the end in the −X direction of the bottom wall 124. The first side wall 126 includes, for example, a body 126A having a trapezoidal shape when viewed in the X direction, an extension portion 126B extending in the −Y direction from the end in the −Z direction of the body 126A, and a projecting portion 126C projecting in the +Y direction from the end in the −Z direction of the body 126A.

The second side wall 128 extends straight vertically in the +Z direction from the end in the +X direction of the bottom wall 124. The second side wall 128 is smaller than the first side wall 126. The coupling wall (not illustrated) extends straight vertically in the +Z direction from the end in the +Y direction of the bottom wall 124 and couples the first side wall 126 and the second side wall 128 to each other in the X direction. The bottom wall 124 supports the head 97A of the adjuster 96. The body 126A of the first side wall 126 is fastened to the vertical wall 72 with a screw 127. The projecting portion 126C is fastened to the attachment frame 13 with a screw 127. The second side wall 128 is fastened to the end in the −X direction of the guide frame 76 with screws 127.

Next, the operation of the recording system 1 according to the present embodiment will be described. FIGS. 1 to 11 are referred for the components of the recording system 1 without identification of the individual figure numbers.

In the recording system 1, before positioning of the post-processing apparatus 60, the slider 78 is slid in the −X direction to enable movement of the holder 68 in the +Y direction. In this state, when the holder 68 is moved in the +Y direction, the pin 66 is inserted in the vertical hole (not illustrated), and thus the movement of the pin 66 in the X direction is limited. In other words, the post-processing apparatus 60 is positioned in the X direction. Next, the protrusion 82 is brought in contact with the front wall 63 and the slider 78 is slid in the +X direction. This causes insertion of a portion of the insertion portion 84 into the vertical hole 73 and contact between the holder 68 and the wall portion 79B. Thus, the post-processing apparatus 60 is positioned in the Y direction. Next, after adjustment of the position of the post-processing apparatus 60 in the Z direction using the adjuster 96, the insertion portion 84 is fastened to the vertical wall 72 with a screw 85. Thus, the post-processing apparatus 60 is positioned in the Z direction.

In the recording system 1, the post-processing apparatus 60 is supported by the first support 102 mounted on the floor 2, enabling the post-processing apparatus 60 to be reliably supported even when the post-processing apparatus 60 increases in size. Furthermore, the space 103 formed by the first support 102 allows easier operation of the manual feed tray 18 and the opening/closing portion 34. In the recording system 1, the post-processing apparatus 60 does not need to be moved for processes at the manual feed tray 18 and the opening/closing portion 34.

In the recording system 1, the manual feed tray 18 and the opening/closing portion 34 are located forward from the leg 104 in the X direction. This reduces the possibility that, when the manual feed tray 18 and the opening/closing portion 34 are operated, the first support 102 will become an obstacle to the operation. Furthermore, the leg 104 overlaps at least a portion of the manual feed tray 18 and the opening/closing portion 34 when viewed in the X direction. This makes the recording system 1 smaller in a direction intersecting both the Z direction and the X direction.

In the recording system 1, a portion of the post-processing apparatus 60 that is located rearward from the center of gravity G in the X direction is supported by the leg 104. A portion of the post-processing apparatus 60 that is located forward from the center of gravity G in the X direction is supported by the second support 122. This reduces the possibility that the post-processing apparatus 60 will be tilted forward from the center of gravity G in the X direction.

In the recording system 1, the second support 122 is located above the manual feed tray 18 and the opening/closing portion 34 in the printer 10, i.e., the second support 122 is not located at the same height as the manual feed tray 18 and the opening/closing portion 34. This reduces the possibility that, when the manual feed tray 18 and the opening/closing portion 34 are operated, the second support 122 will become an obstacle to the operation.

If there is a gap between the post-processing apparatus 60 and the second support 122 before the post-processing apparatus 60 is supported by the second support 122, the post-processing apparatus 60 will be supported by the second support 122 while being tilted toward the second support 122. Here, in the recording system 1, the adjuster 96 fills the gap between the post-processing apparatus 60 and the second support 122, reducing the possibility that the post-processing apparatus 60 will be tilted. In other words, this configuration enables the post-processing apparatus 60 to maintain the posture, resulting in a reduction of transportation error of the sheet P from the printer 10 to the post-processing apparatus 60. In addition, this configuration allows the height of the post-processing apparatus 60 to be adjusted at the front side in the X direction, enabling easy adjustment of the height of the post-processing apparatus 60.

In the recording system 1, the mounting portion 112 having the leg 104 thereon extends forward in the X direction. The mounting portion 112 limits the rotation of the leg 104 in a direction in which the leg 104 is tilted forward. This reduces the possibility that the first support 102 will be tilted forward.

In the recording system 1, the manual feed tray 18 and the opening/closing portion 34 are located forward from the leg 104 in the X direction and the operation lever 38 is located at the front side of the opening/closing portion 34. This configuration allows the operation lever 38 to be more readily operated than an operation lever 38 located at the rear side.

In the recording system 1, when the cover 36 is in a fully open position, the front end 34A of the cover 36 does not protrude outward from a space below the post-processing apparatus 60. When the recording system 1 is mounted, this configuration eliminates the need of securing a space for opening and closing the cover 36, and thus an extra mounting space is not required.

The recording system 1 according to the embodiment of the present disclosure basically has the above-described configuration. However, the configuration may be partly modified or partly omitted without departing from the gist of the present disclosure.

The leg 104 may be located away from the manual feed tray 18 and the opening/closing portion 34 in the −Y direction. The leg 104 may be located away from the manual feed tray 18 and the opening/closing portion 34 both in the +X direction and the −Y direction. Furthermore, the leg 104 may overlap the entire manual feed tray 18 and the entire opening/closing portion 34 when viewed in the X direction. The support 100 does not need to have the second support 122.

The first support 102 does not need to have the mounting portion 112. The second support 122 does not need to be located at the front side in the X direction and may be located next to the center of gravity G in the Y direction. Furthermore, the second support 122 may be located below the processing portion. Furthermore, the second support 122 is not limited to one directly supporting the adjuster 96 and may be one indirectly supporting the adjuster 96 through another component.

The operation lever 38 does not need to be located forward from the center in the X direction of the opening/closing portion 34. The front end 34A of the opening/closing portion 34 may be located outside the mounting area S2 when the cover 36 is in a fully open position. The operation lever 38 does not need to directly keep the cover 36 closed at the side portion 28A. In other words, the cover 36 may be kept closed at the side portion 28A by a retainer (not illustrated). The operation member 21 itself does not need to engage with the second opening 17B. In other words, the operation member 21 may engage with the second opening 17B through an engagement portion (not illustrated). Another example of the processing portion includes a large-capacity paper feeder mounted in the printer 10 or coupled to the printer 10. A large-capacity paper feeder may be mounted in the space 103.

The post-processing apparatus 60 may be entirely located outside the mounting area S1 or partly located outside the mounting area S1 with the rest being in the mounting area S1. The post-processing apparatus 60 does not need to have the adjuster 96. For example, the adjuster 96 may be independent from the post-processing apparatus 60. The bottom member 86 may be included in the support 100.

What is claimed is:

1. A recording system comprising:

a recording apparatus configured to record on a medium;

a post-processing apparatus configured to perform a post-processing on the medium sent from the recording apparatus; and a first support to be mounted on a floor outside a mounting area of the recording apparatus, wherein the recording apparatus includes a processing portion configured to be moved outward from a body of the recording apparatus to enable a process, the post-processing apparatus is located, in an apparatus height direction, above the processing portion that was moved, and the first support supports the post-processing apparatus and forms a space in which the processing portion is moved.

2. The recording system according to claim 1, wherein the first support includes a leg extending in the apparatus height direction and located rearward from the processing portion in an apparatus depth direction, and the leg overlaps, when viewed in the apparatus depth direction, at least a portion of the processing portion that was moved.

3. The recording system according to claim 2, wherein the recording apparatus includes a second support supporting the post-processing apparatus, the leg is located rearward from a center of gravity of the post-processing apparatus in the apparatus depth direction, and the second support is located forward from the center of gravity of the post-processing apparatus in the apparatus depth direction.

4. The recording system according to claim 3, wherein the second support is located above the processing portion in the apparatus height direction.

5. The recording system according to claim 3, wherein the post-processing apparatus includes an adjuster configured to adjust a position of the post-processing apparatus in the apparatus height direction, and the second support supports the adjuster.

6. The recording system according to claim 2, wherein the first support includes a mounting portion to be mounted on the floor, and the mounting portion has the leg thereon and extends forward from the leg in the apparatus depth direction.

7. The recording system according to claim 2, wherein the processing portion includes a cover configured to open and close a side portion of the recording apparatus and an operation lever configured to keep the cover closed at the side portion and terminate a state of keeping the cover closed when operated, and the operation lever is located forward from a center of the processing portion in the apparatus depth direction.

8. The recording system according to claim 7, wherein the cover is configured to be rotated about a rotation shaft of the recording apparatus to open and close the side portion, and the cover in a fully open position has an end, farthest from the rotation shaft, which is in a mounting area of the post-processing apparatus when viewed in the apparatus height direction.

* * * * *